(12) United States Patent
Meng et al.

(10) Patent No.: US 12,193,368 B2
(45) Date of Patent: Jan. 14, 2025

(54) BURIED INFILTRATING IRRIGATION PIPE WITH MULTI-CAVITY WATER INLET STEADY FLOW CHANNEL, TWO CLAMPS AND BUILT-IN DOWELS

(71) Applicant: Shandong Changjiang Water-Saving Irrigation Tech Co., Ltd, Jinan (CN)

(72) Inventors: Shiming Meng, Jinan (CN); Xianwu Meng, Jinan (CN); Juan Du, Jinan (CN); Guodong Cheng, Jinan (CN); Qunying Sun, Jinan (CN)

(73) Assignee: Shandong Changjiang Water-Saving Irrigation Tech Co., Ltd, Jinan (CN)

( * ) Notice: Subject to any disclaimer, the term of this patent is extended or adjusted under 35 U.S.C. 154(b) by 239 days.

(21) Appl. No.: 17/945,387

(22) Filed: Sep. 15, 2022

(65) Prior Publication Data

US 2023/0078741 A1 Mar. 16, 2023

(30) Foreign Application Priority Data

Sep. 16, 2021 (CN) .......................... 202111087358.9

(51) Int. Cl.
*A01G 25/06* (2006.01)
*A01G 25/16* (2006.01)

(52) U.S. Cl.
CPC ............. *A01G 25/06* (2013.01); *A01G 25/16* (2013.01)

(58) Field of Classification Search
CPC ....... A01G 25/06; A01G 25/023; A01G 25/16
See application file for complete search history.

(56) References Cited

U.S. PATENT DOCUMENTS

| 5,111,996 | A  | * | 5/1992 | Eckstein | A01G 25/023 239/533.1 |
| 2002/0104902 | A1 | * | 8/2002 | Eckstein | A01G 25/026 239/542 |
| 2014/0070029 | A1 | * | 3/2014 | Alkalay | A01G 25/023 239/542 |

FOREIGN PATENT DOCUMENTS

CN 103828688 * 6/2014

* cited by examiner

*Primary Examiner* — Carib A Oquendo
(74) *Attorney, Agent, or Firm* — Barley Snyder

(57) ABSTRACT

Disclosed is a buried infiltrating irrigation pipe with a multi-cavity water inlet steady flow channel, two clamps and built-in dowels. The buried infiltrating irrigation pipe comprises an internally embedded water dropper and an externally embedded short infiltrating pipe which are located at the same position of a water conveying pipe. The internally embedded water dropper is fixedly arranged in the water conveying pipe and the externally embedded short infiltrating pipe is clamped outside the water conveying pipe. A multi-cavity water inlet steady flow channel is arranged in the internally embedded dropper, a plurality of inner water inlets are formed in one end of the multi-cavity water inlet steady flow channel in parallel, and inner water outlets are formed in the other end of the multi-cavity water inlet steady flow channel.

17 Claims, 5 Drawing Sheets

BURIED INFILTRATING IRRIGATION PIPE WITH MULTI-CAVITY WATER INLET STEADY FLOW CHANNEL, TWO CLAMPS AND BUILT-IN DOWELS

CROSS REFERENCE TO RELATED APPLICATION

This patent application claims the benefit and priority of Chinese Patent Application No. 202111087358.9, filed on Sep. 16, 2021, the disclosure of which is incorporated by reference herein in its entirety as part of the present application.

FIELD OF THE INVENTION

The present disclosure relates to the technical field of agricultural irrigation, in particular to a buried infiltrating irrigation pipe with a multi-cavity water inlet steady flow channel, two clamps and built-in dowels.

BACKGROUND

Agricultural irrigation is in the forms of furrow irrigation, sprinkling irrigation, drip irrigation, infiltrating irrigation and the like. The infiltrating irrigation is the most scientific and advanced. Soil is still kept in a loose state after irrigation, the soil structure is not damaged, and the soil surface is not hardened. The earth surface soil humidity is low, and the ground evaporation can be reduced. The pipeline is buried underground, so that the occupied area is reduced. The irrigation amount is small, and the irrigation efficiency is high. According to the infiltrating irrigation technology, a water infiltrating pipe with a plurality of water infiltrating holes is laid on farmland, forest land, nursery garden and the like, and then a water source is connected, so that water is infiltrated through the water infiltrating holes through increased water pressure so as to moisten soil and supply water required by plants planted in the soil; the evaporation amount of water exposed to sunlight is reduced, water is saved by 80%, and labor is saved by 85%. The existing infiltrating irrigation pipe has the defects that, firstly, the pipeline is blocked under external buried soil and negative pressure and is difficult to check and maintain. Secondly, the water flow at the water dropper is unstable, and the water infiltrating amount is difficult to accurately control.

SUMMARY

The present disclosure aims to provide a buried infiltrating irrigation pipe with a multi-cavity water inlet steady flow channel, two clamps and built-in dowels to solve the problems existing in the prior art, so that the pipeline is not prone to being blocked, and the water outlet of the water infiltrating grooves is stable.

In order to achieve the purpose, the present disclosure provides the following scheme.

The present disclosure provides a buried infiltrating irrigation pipe with a multi-cavity water inlet steady flow channel, two clamps and built-in dowels. The diameter of the infiltrating irrigation pipe may be from $\varphi 4$ mm to $\varphi 25$ mm, with $\varphi 16$ mm and $\varphi 20$ mm used in certain embodiments. The infiltrating irrigation pipe is paved with a water dropper with a special length requirement, the diameter size can be increased, and a compensating plate can be arranged in the water dropper. The infiltrating irrigation pipe comprises an internally embedded water dropper and an externally embedded short infiltrating pipe which are located at the same position of a water conveying pipe. The internally embedded water dropper is fixedly arranged in the water conveying pipe, and the externally embedded short infiltrating pipe is clamped outside the water conveying pipe. A multi-cavity water inlet steady flow channel is arranged in the internally embedded dropper, a plurality of inner water inlets are formed in one end of the multi-cavity water inlet steady flow channel in parallel, inner water outlets are formed in the other end of the multi-cavity water inlet steady flow channel, and the inner water outlets penetrate through the water conveying pipe and then communicate with water infiltrating flow channels in the externally embedded short infiltrating pipe. A plurality of water infiltrating grooves communicating with the outside are formed in the two sides of the externally embedded short infiltrating pipe, and the water infiltrating groove communicates with the water infiltrating flow channel. The multi-cavity water inlet steady flow channel is short, the inner water inlet is small according to the requirement of the water outlet flow in unit time, the space of a water outlet cavity is increased under the same size, the water outlet cavity is large and high in blocking resistance, and the problems of blocking resistance and long service life of the buried infiltrating irrigation pipe are mainly solved.

Optionally, a two-way diversion channel is formed in the end, away from the inner water inlets, of the multi-cavity water inlet steady flow channel. The two-way diversion channel communicates with an inner water outlet flow channel, and the inner water outlets are formed in the inner water outlet flow channel; the size of the inner water outlet is larger than that of the inner water inlet.

Optionally, the externally embedded short infiltrating pipe comprises a first outer clamp and a second outer clamp which are symmetrically arranged; the cross section of the first outer clamp and the cross section of the second outer clamp are both of a semicircular structure. Concave water infiltrating flow channels are formed in the first outer clamp, in the positions of the inner water outlets and communicate with the inner water outlets. The water infiltrating flow channels communicate with water infiltrating steady flow channels, the first outer clamp and the second outer clamp are the same in internal structures and are symmetrically arranged, and the water infiltrating flow channels of the first outer clamp communicate with the water infiltrating flow channels of the second outer clamp. The water infiltrating grooves are formed in the opposite end faces of the two sides of the first outer clamp and the second outer clamp, one end of each of the water infiltrating grooves communicates with the outside, and the other ends of the water infiltrating grooves communicate with the water infiltrating steady flow channels. The water infiltrating grooves in the end face of the first outer clamp and the water infiltrating grooves in the end face of the second outer clamp are arranged in a one-to-one correspondence and communicating mode, and the projections of the center lines of the two correspondingly arranged water infiltrating grooves are parallel to and do not intersect with each other.

Optionally, a plurality of protruding dowels are fixedly arranged on the end faces of the two sides of the first outer clamp, a plurality of dowel holes are formed in the end faces of the two sides of the second outer clamp and correspond to the dowels in a one-to-one mode, and the depth of the dowel hole is not smaller than the length of the dowel. The first outer clamp and the second outer clamp are fixedly connected through the dowels inserted into the dowels holes. The externally embedded short infiltrating pipe can be made of HDPE, PP, ABS, PET and PVC, and the hole diameter matching sizes of the dowels and the dowel holes are designed according to the shrinkage amount of different materials. The built-in dowels mainly solves the problems that online automatic production is difficult to realize, clamping and screening of infiltrating irrigation pipes due to irregular screening operation of clamps with two clamps and external dowels in other modes, the production efficiency is affected, labor and time are wasted, the product quality stability is not guaranteed, and the pipe placing efficiency in the infiltrating irrigation pipe embedding process is affected. The external dowel is provided with a dowel edge. In the automatic pipe placing process, scratching is formed by hard objects to cause displacement of outer clamps, and the outer anti-blocking performance of a product is reduced. The built-in dowels are arranged, the surfaces of the two outer clamps are smooth, and the built-in dowels are designed to be circular dowel heads and are designed on the first outer clamp. The uppermost end of the dowel head forms an obtuse angle to be matched with the dowel hole. 15 to 20 filaments are protruded at the position 2 mm to 3 mm lower than the dowel head. The dowel hole is formed in the second outer clamp, and the dowel hole is an impermeable hole. The hole diameter of the dowel hole is tightly matched with the size of the dowel. The outer opening of the hole diameter of the dowel hole is smaller than the protrusion with the largest dowel diameter. The dowels are inserted into the dowel holes through external force, and the two clamps cannot be separated tightly. More than three dowels are designed for stability, the water infiltrating grooves are formed in the tail end planes of the two clamps, and the size of the water infiltrating groove is not more than 20 filaments in width and depth. The water infiltrating grooves between the two clamps need to be staggered to prevent root system invasion of plants, the size of the water infiltrating groove can be increased when plants grow in a short time, and the total flow of the groove is larger than the water outlet flow of the inner steady flow channel.

Optionally, the inner water outlets are formed in the middle position of the internally embedded water dropper, the two sides of the water infiltrating flow channel symmetrically communicate with the water infiltrating steady flow channels, and the outer side of the water infiltrating steady flow channel communicates with the adjacent water infiltrating grooves respectively.

Optionally, two inner water outlets are symmetrically formed in the two ends of the internally embedded water dropper, two water infiltrating flow channels are formed in the two ends of the first outer clamp and the two ends of the second outer clamp respectively, and the two water infiltrating flow channels communicate with one of the inner water outlets respectively. The water infiltrating flow channels located at the two ends are connected through a plurality of water infiltrating steady flow channels, and the outer side of the water infiltrating steady flow channel communicates with the adjacent water infiltrating grooves respectively.

Compared with the prior art, the present disclosure has the following technical effects.

By the multi-cavity water inlet design, the inner water inlet of the water inlet cavity is smaller than the gap of the water outlet flow channel, through the anti-blocking design of steady flow water outlet end and the built-in dowel design of the outer clamps in the buried infiltrating irrigation pipe, the external infiltrating flow channel is more reliable, and plant root system intrusion and negative pressure mud suction are prevented. The two outer clamps are smooth in appearance, and the external pressure bearing capacity is improved. The stability of embedding with the pipe wall is enhanced, automatic screening of the outer clamps is achieved, online production automation of the infiltrating irrigation pipe outer clamp equipment is achieved, the production efficiency is improved, labor is reduced, the product quality and reliability are improved, and intelligent detection is adopted in the production process.

BRIEF DESCRIPTION OF THE DRAWINGS

To more clearly illustrate the embodiment of the present disclosure or the technical scheme in the prior art, the following briefly introduces the attached figures to be used in the embodiment. The attached figures in the following description show merely some embodiments of the present disclosure, and those skilled in the art may still derive other drawings from these attached figures without creative efforts.

Reference signs: 100, buried infiltrating irrigation pipe with multi-cavity water inlet steady flow channel, two clamps and built-in dowels; 1, water conveying pipe; 2, internally embedded water dropper; 3, externally embedded short infiltrating pipe; 4, multi-cavity water inlet steady flow channel; 5, inner water inlet; 6, inner water outlet; 7, water infiltrating flow channel; 8, water infiltrating groove; 9, water infiltrating steady flow channel; 10, two-way diversion channel; 11, isolation platform; 12, water stopping platform; 13, first outer clamp; 14, second outer clamp; 15, dowel; and 16, dowel hole.

DETAILED DESCRIPTION OF THE EMBODIMENTS

The following clearly and completely describes the technical scheme in the embodiments of the present disclosure with reference to the attached figures in the embodiments of the present disclosure. The described embodiments are merely a part rather than all of the embodiments of the present disclosure. All other embodiments obtained by those skilled in the art based on the embodiments of the present disclosure without creative efforts shall fall within the protection scope of the present disclosure.

The present disclosure aims to provide a buried infiltrating irrigation pipe with a multi-cavity water inlet steady flow channel, two clamps and built-in dowels to solve the problems existing in the prior art, so that the pipeline is not prone to being blocked, and the water outlet of the water infiltrating grooves is stable.

To make the foregoing objective, features and advantages of the present disclosure clearer and more comprehensible, the present disclosure is further described in detail below with reference to the attached figures and specific embodiments.

Embodiment I

Figure 1:
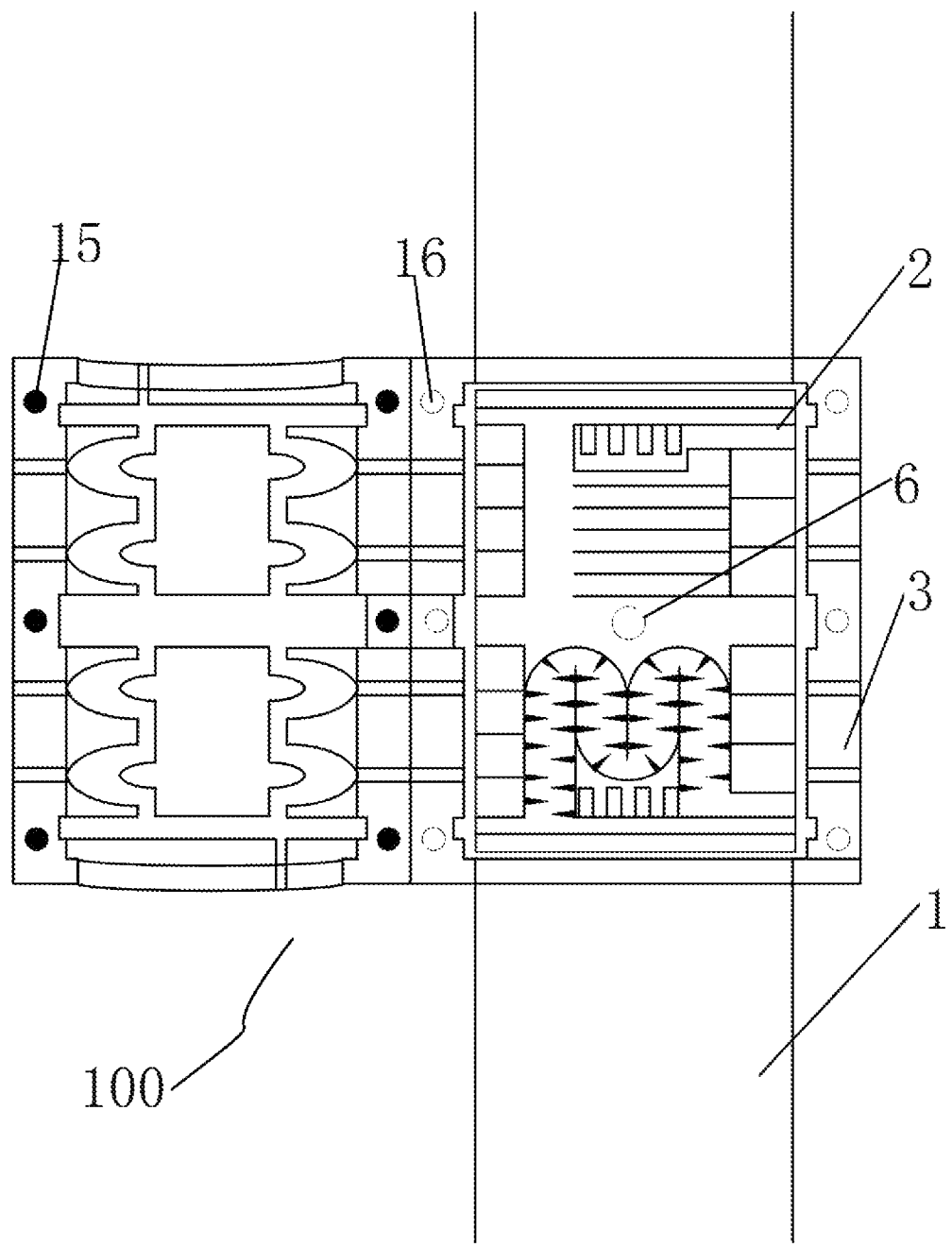
FIG. 1 is a structural schematic diagram of a buried infiltrating irrigation pipe with a multi-cavity water inlet steady flow channel, two clamps and built-in dowels in the first embodiment of the present disclosure.
Figure 2:
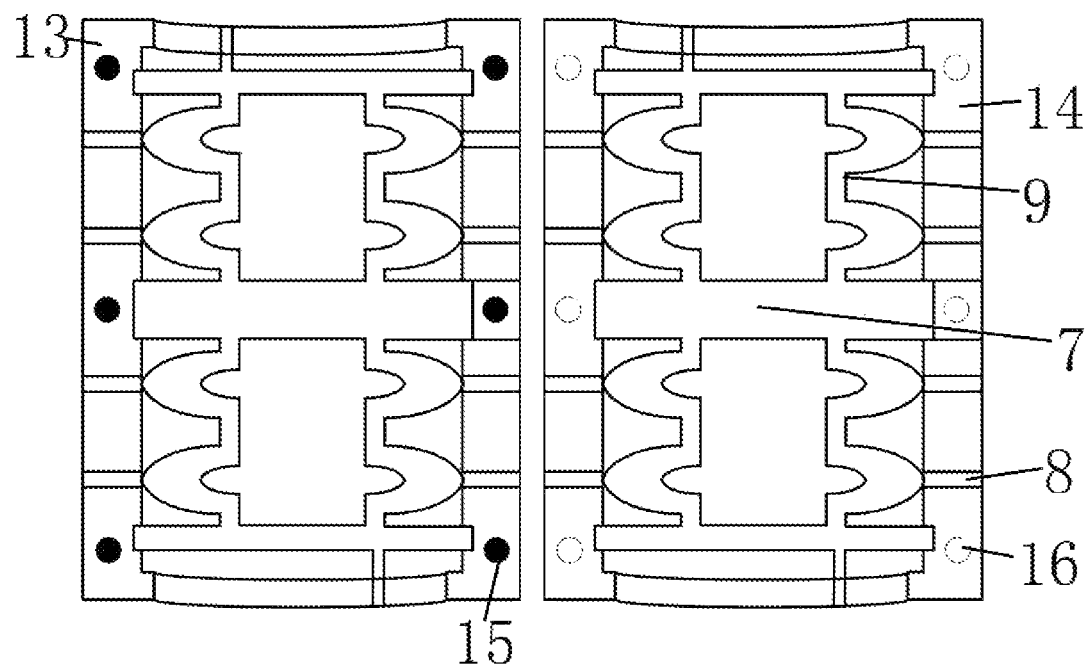
FIG. 2 is a structural schematic diagram of an externally embedded short infiltrating pipe in the first embodiment of the present disclosure.
Figure 3:
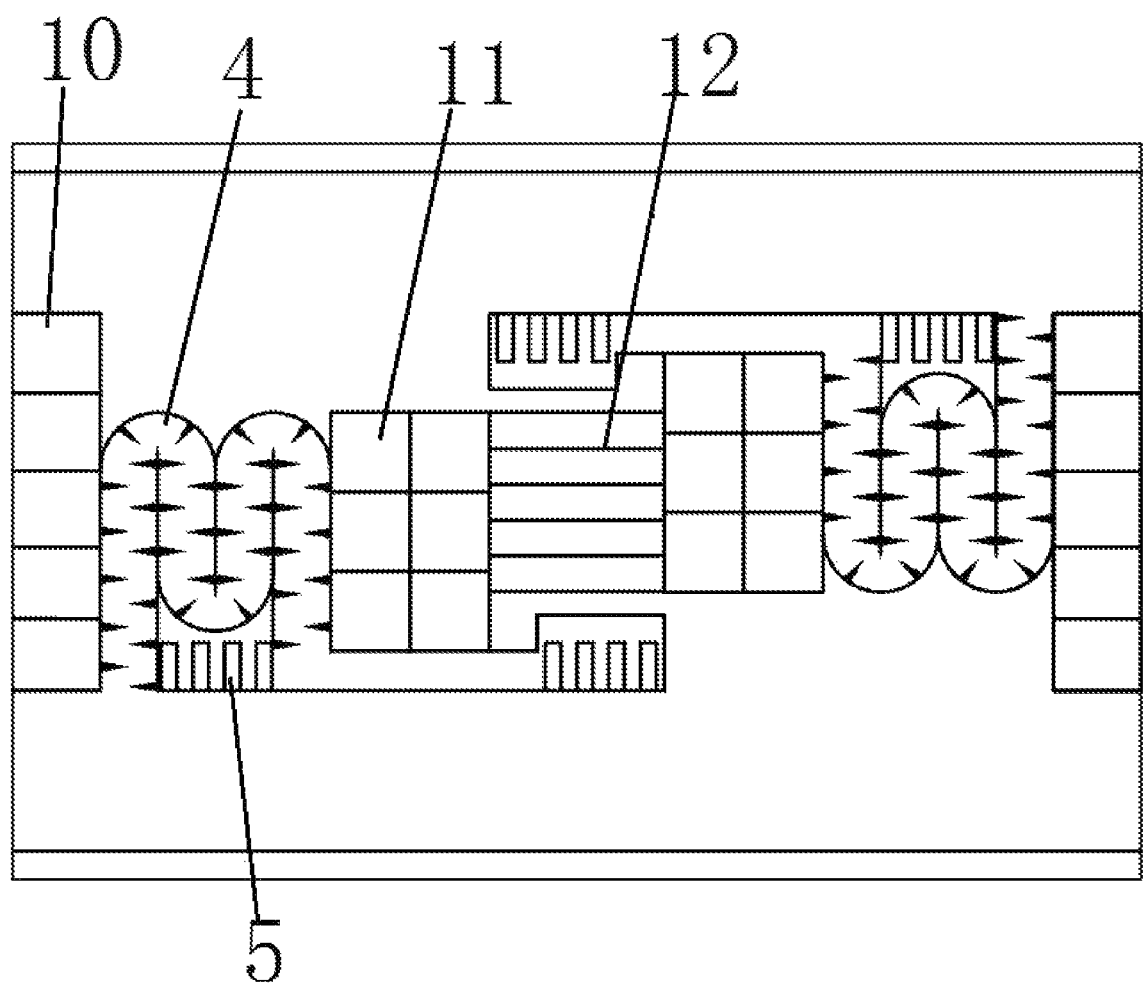
FIG. 3 is a structural schematic diagram of an internally embedded water dropper in the present disclosure.

Referring to FIGS. 1 to 3, the present disclosure provides a buried infiltrating irrigation pipe 100 with a multi-cavity water inlet steady flow channel, two clamps and built-in dowels. The pipe wall of the infiltrating irrigation pipe is made of a composite material, and the composite material is elastic. The stability of two outer clamps is enhanced. The diameter of the infiltrating irrigation pipe may be from φ4 mm to φ25 mm, and φ16 mm and φ20 mm are used in certain embodiments. The infiltrating irrigation pipe is paved with a water dropper with a special length requirement, the diameter size can be increased, and a compensating plate can be arranged in the water dropper. The infiltrating irrigation pipe comprises an internally embedded water dropper 2 and an externally embedded short infiltrating pipe 3 which are located at the same position of a water conveying pipe 1. The internally embedded water dropper 2 is fixedly arranged in the water conveying pipe 1, and the externally embedded short infiltrating pipe 3 is clamped outside the water conveying pipe 1. A multi-cavity water inlet steady flow channel 4 is arranged in the internally embedded dropper 2, a plurality of inner water inlets 5 are formed in one end of the multi-cavity water inlet steady flow channel 4 in parallel, inner water outlets 6 are formed in the other end of the multi-cavity water inlet steady flow channel 4, and the inner water outlets 6 penetrate through the water conveying pipe 1 and then communicate with water infiltrating flow channels 7 in the externally embedded short infiltrating pipe 3, a plurality of water infiltrating grooves 8 communicating with the outside are formed in the two sides of the externally embedded short infiltrating pipe 3, and the water infiltrating groove 8 communicates with the water infiltrating flow channel 7 through a water infiltrating steady flow channel 9. The multi-cavity water inlet steady flow channel 4 is short, the inner water inlet 5 is small according to the requirement of the water outlet flow in unit time, the space of a water outlet cavity is increased under the same size, the water outlet cavity is large and high in blocking resistance, and the problems of blocking resistance and long service life of the buried infiltrating irrigation pipe are mainly solved.

Specifically, a two-way diversion channel 10 is formed in the end, away from the inner water inlets 5, of the multi-cavity water inlet steady flow channel 4, the two-way diversion channel 10 communicates with an inner water outlet flow channel, and the inner water outlets 6 are formed in the inner water outlet flow channel; and the size of the inner water outlet 6 is larger than that of the inner water inlet 5. The inner water outlets 6 are formed in the middle position of the internally embedded water dropper 2, the two sides of the water infiltrating flow channel 7 symmetrically communicate with the water infiltrating steady flow channels 9, and the outer side of the water infiltrating steady flow channel 9 communicates with the adjacent water infiltrating grooves 8 respectively. A two-end water inlet multi-cavity design, a middle water outlet structure and a shunt structure in the middle of the externally embedded short infiltrating pipe 3 are adopted, secondary flow stabilization is achieved, inner water inlets 5 in the two ends communicate with the respective water inlet cavities respectively, and the water inlet cavities at the two ends are separated through an isolation platform 11 and a water stopping platform 12.

The externally embedded short infiltrating pipe 3 comprises a first outer clamp 13 and a second outer clamp 14 which are symmetrically arranged; the cross section of the first outer clamp 13 and the cross section of the second outer clamp 14 are both of a semicircular structure, concave water infiltrating flow channels 7 are formed in the first outer clamp 13, formed in the positions of the inner water outlets 5 and communicate with the inner water outlets 5 penetrating through the water conveying pipe 1, the water infiltrating flow channels 7 communicate with water infiltrating steady flow channels 9, the first outer clamp 13 and the second outer clamp 14 are the same in internal structures and are symmetrically arranged, and the water infiltrating flow channels 7 of the first outer clamp 13 communicate with the water infiltrating flow channels 7 of the second outer clamp 14; the water infiltrating grooves 8 are formed in the opposite end faces of the two sides of the first outer clamp 13 and the second outer clamp 14, one end of each of the water infiltrating grooves 8 communicates with the outside, and the other ends of the water infiltrating grooves communicate with the water infiltrating steady flow channels 9; the water infiltrating grooves 8 in the end face of the first outer clamp 13 and the water infiltrating grooves 8 in the end face of the second outer clamp 14 are arranged in a one-to-one correspondence and communicating mode, and the projections of the center lines of the two correspondingly arranged water infiltrating grooves 8 are parallel to and do not intersect with each other, namely, the water infiltrating grooves 8 between the two clamps need to be staggered to prevent root system invasion of plants, the size of the water infiltrating groove 8 can be increased when plants grow in a short time, and the total flow of the groove is larger than the water outlet flow of the inner steady flow channel.

A plurality of protruding dowels 15 are fixedly arranged on the end faces of the two sides of the first outer clamp 13, a plurality of dowel holes 16 are formed in the end faces of the two sides of the second outer clamp 14 and correspond to the dowels 15 in a one-to-one mode, and the depth of the dowel hole 16 is not smaller than the length of the dowel 15, and the first outer clamp 13 and the second outer clamp 14 are fixedly connected through the dowels 15 inserted into the dowels holes 16. The externally embedded short infiltrating pipe 3 can be made of HDPE, PP, ABS, PET and PVC, and the hole diameter matching sizes of the dowels 15 and the dowel holes 16 are designed according to the shrinkage amount of different materials. The built-in dowels 15 mainly solves the problems that online automatic production is difficult to realize during automatic online production, clamping and screening of infiltrating irrigation pipes due to irregular screening operation of clamps with two clamps and external dowels in other modes, the production efficiency is affected, labor and time are wasted, the product quality stability is not guaranteed, and the pipe placing efficiency in the infiltrating irrigation pipe embedding process is affected. The external dowel is provided with a dowel edge. In the automatic pipe placing process, scratching is formed by hard objects to cause displacement of outer clamps, and the outer anti-blocking performance of a product is reduced. The built-in dowels 15 are arranged, the surfaces of the two outer clamps are smooth, and the built-in dowels 15 are designed to be circular dowel heads and are designed on the first outer clamp 13. The uppermost end of the dowel head forms an obtuse angle to be matched with the dowel hole 16. 15 to 20 filaments are protruded at the position 2 mm to 3 mm lower than the dowel head. The dowel hole 16 is formed in the second outer clamp 14, and the dowel hole 16 is an impermeable hole. The hole diameter of the dowel hole 16 is tightly matched with the size of the dowel 15. The outer opening of the hole diameter of the dowel hole 16 is smaller than the protrusion with the largest dowel diameter. The dowels 15 are inserted into the dowel holes 16 through external force, and the two clamps cannot be separated tightly. More than three dowels 15 are designed for stability, the water infiltrating grooves 8 are formed in the tail end planes of the two clamps, and the size of the water infiltrating groove 8 is not more than 20 filaments in width and depth.

Embodiment II

Figure 4:
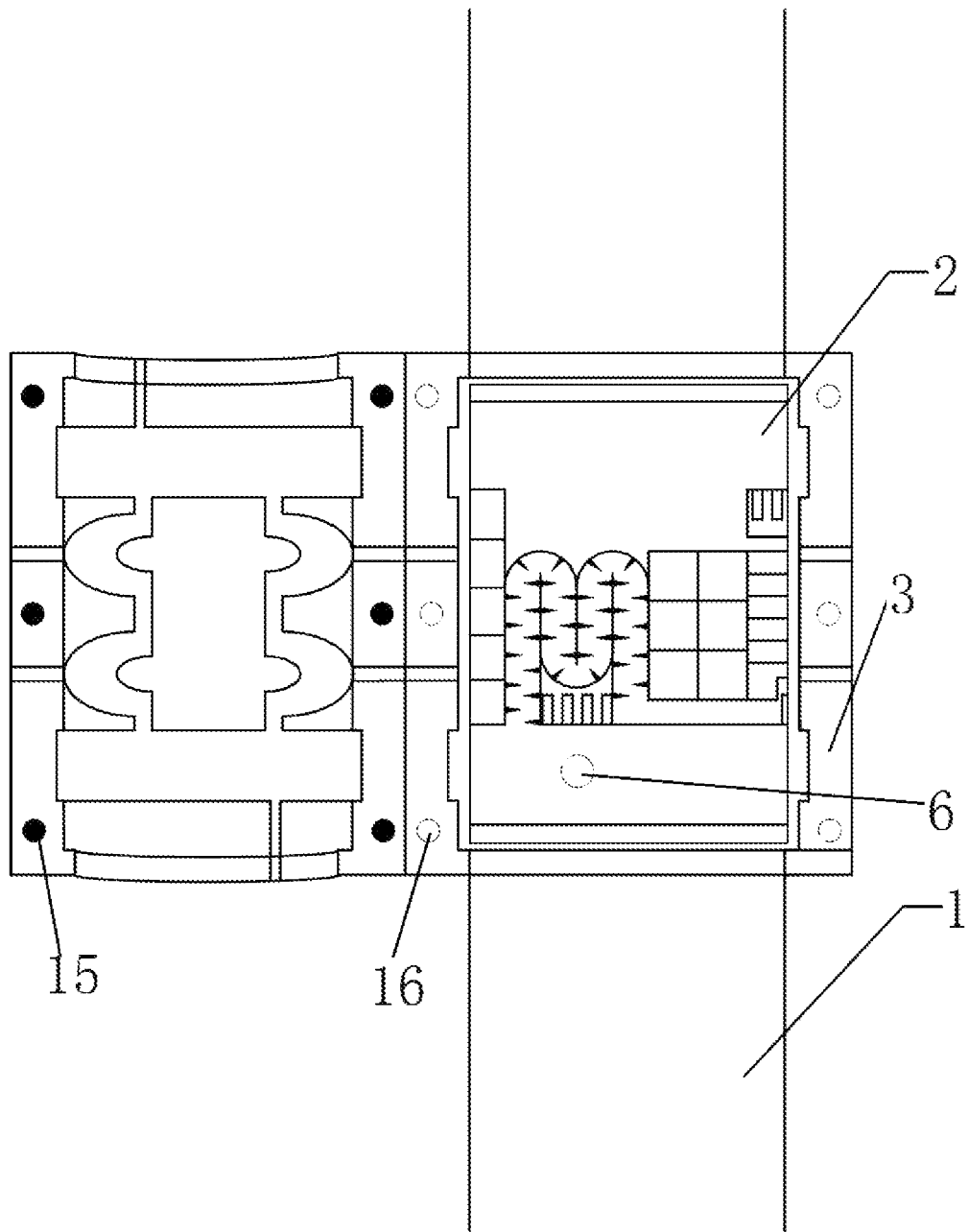
FIG. 4 is a structural schematic diagram of a buried infiltrating irrigation pipe with a multi-cavity water inlet steady flow channel, two clamps and built-in dowels in the second embodiment of the present disclosure.
Figure 5:
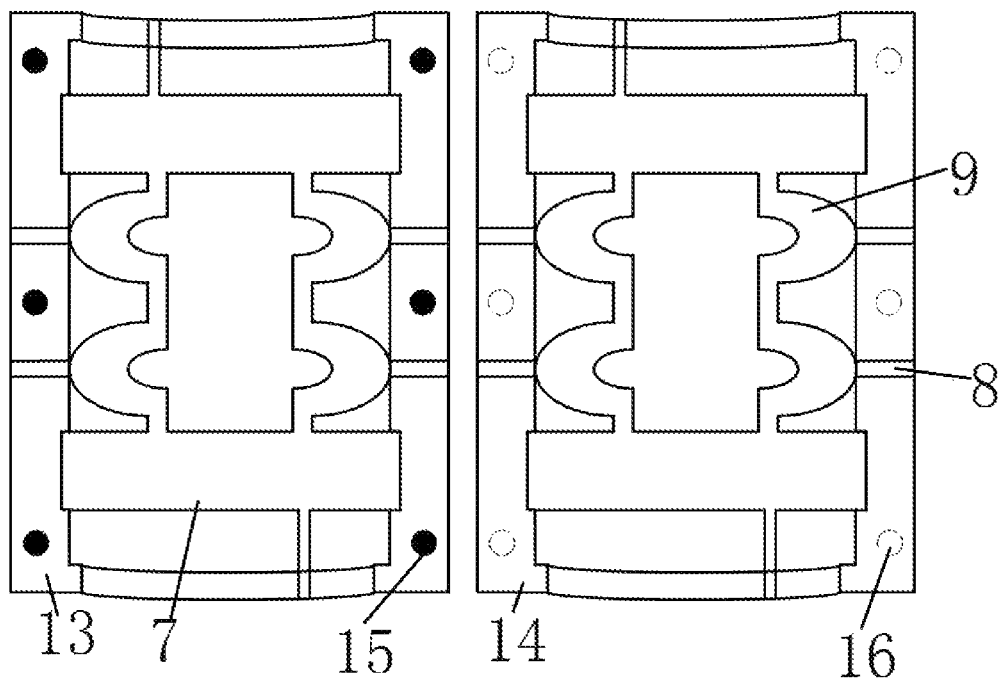
FIG. 5 is a structural schematic diagram of an externally embedded short infiltrating pipe in the second embodiment of the present disclosure.

The embodiment is improved on the basis of the first embodiment. Referring to FIG. 4 and FIG. 5, in the embodiment, a two-end water inlet and a two-end water outlet structure is adopted, two inner water outlets 5 are symmetrically formed in the two ends of the internally embedded water dropper 2, two water infiltrating flow channels 7 are formed in the two ends of the first outer clamp 13 and the two ends of the second outer clamp 14 respectively, and the two water infiltrating flow channels 7 communicate with one of the inner water outlets 5 respectively; the water infiltrating flow channels 7 located at the two ends are connected through a plurality of water infiltrating steady flow channels 9, and the outer side of the water infiltrating steady flow channel 9 communicates with the adjacent water infiltrating grooves 8 respectively. The externally embedded short infiltrating pipe 3 adopts a two-end shunt structure, so that secondary flow stabilization is realized.

The anti-blocking product reliability of the buried infiltrating irrigation pipe and the advancement of the product production technology are improved, the large-area use of the infiltrating irrigation pipe in corn and wheat crops in fields is enhanced, and the practicability of mechanical one-time ditching and pipe laying is achieved. The water, fertilizer, pesticide and gas integration of agricultural planting is achieved through the buried infiltrating irrigation pipe. As buried infiltrating irrigation is used all the year round, the infiltrating irrigation pipe becomes a beneficial method for achieving agricultural planting intelligence.

The buried infiltrating irrigation pipe is beneficial to the nation and the people, saves water and labor, reduces fertilizers and improves efficiency, is green and environmentally-friendly, is beneficial to ecological civilization, is a powerful mode for reducing carbon emission in agriculture, is a new business state of agricultural irrigation, is an example of new and old kinetic energy conversion, and has huge social benefits and economic benefits. The present disclosure can realize development of an advanced policy of agricultural water saving, and a contribution is made for ensuring the safety of grains in the technology of storing the grains in the ground.

In the description of the present disclosure, it needs to be illustrated that the indicative direction or position relations of the terms such as "center", "top", "bottom", "left", "right", "vertical", "horizontal", "inside" and "outside" are direction or position relations illustrated based on the attached figures, just for facilitating the description of the present disclosure and simplifying the description, but not for indicating or hinting that the indicated device or element must be in a specific direction and is constructed and operated in the specific direction, the terms cannot be understood as the restriction of the present disclosure. Moreover, the terms such as "first" and "second" are just used for distinguishing the description, but cannot be understood to indicate or hint relative importance.

Specific examples are used for illustration of the principles and implementation methods of the present disclosure. The description of the above-mentioned embodiments is used to help illustrate the method and its core principles of the present disclosure. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A buried infiltrating irrigation pipe, comprising:
an internally embedded water dropper;
an externally embedded short infiltrating pipe, the internally embedded water dropper and the externally embedded short infiltrating pipe are located at a same position of a water conveying pipe, the internally embedded water dropper is fixedly arranged in the water conveying pipe and the externally embedded short infiltrating pipe is clamped outside the water conveying pipe; and
a multi-cavity water inlet steady flow channel arranged in the internally embedded water dropper, a plurality of inner water inlets are formed in an end of the multi-cavity water inlet steady flow channel in parallel, a plurality of inner water outlets are formed in another end of the multi-cavity water inlet steady flow channel, the inner water outlets penetrate through the water conveying pipe and communicate with a plurality of water infiltrating flow channels in the externally embedded short infiltrating pipe, a plurality of water infiltrating grooves communicating with an outside are formed in a pair of sides of the externally embedded short infiltrating pipe, the water infiltrating grooves communicate with the water infiltrating flow channels;
wherein a two-way diversion channel is formed in the end, away from the inner water inlets, of the multi-cavity water inlet steady flow channel.

2. The buried infiltrating irrigation pipe according to claim 1, wherein the two-way diversion channel communicates with an inner water outlet flow channel, the inner water outlets are formed in the inner water outlet flow channel.

3. The buried infiltrating irrigation pipe according to claim 2, wherein a size of the inner water outlet is larger than that of the inner water inlet.

4. The buried infiltrating irrigation pipe according to claim 1, wherein the externally embedded short infiltrating pipe comprises a first outer clamp and a second outer clamp which are symmetrically arranged.

5. The buried infiltrating irrigation pipe according to claim 4, wherein a cross section of the first outer clamp and a cross section of the second outer clamp are both of a semicircular structure, the water infiltrating flow channels having a concave shape are formed in the first outer clamp in positions of the inner water outlets and communicate with the inner water outlets.

6. The buried infiltrating irrigation pipe according to claim 5, wherein the water infiltrating flow channels communicate with a plurality of water infiltrating steady flow channels.

7. The buried infiltrating irrigation pipe according to claim 6, wherein the first outer clamp and the second outer clamp have a same internal structure and are symmetrically arranged, the water infiltrating flow channels of the first outer clamp communicate with the water infiltrating flow channels of the second outer clamp.

8. The buried infiltrating irrigation pipe according to claim 7, wherein the water infiltrating grooves are formed in opposite end faces of two sides of the first outer clamp and the second outer clamp, one end of each of the water infiltrating grooves communicates with the outside, and the other end of each of the water infiltrating grooves communicates with the water infiltrating steady flow channels.

9. The buried infiltrating irrigation pipe according to claim 8, wherein the water infiltrating grooves in the end face of the first outer clamp and the water infiltrating grooves in the end face of the second outer clamp are arranged in a one-to-one correspondence and communicate, a plurality of projections of center lines of the two correspondingly arranged water infiltrating grooves are parallel to and do not intersect with each other.

10. The buried infiltrating irrigation pipe according to claim 9, wherein a plurality of protruding dowels are fixedly arranged on the end faces of the two sides of the first outer clamp, a plurality of dowel holes are formed in the end faces of the two sides of the second outer clamp and correspond to the dowels.

11. The buried infiltrating irrigation pipe according to claim 10, wherein a depth of each dowel hole is not smaller than a length of the protruding dowels.

12. The buried infiltrating irrigation pipe according to claim 11, wherein the first outer clamp and the second outer clamp are fixedly connected through the dowels inserted into the dowel holes.

13. The buried infiltrating irrigation pipe according to claim 9, wherein the inner water outlets are formed in a middle position of the internally embedded water dropper.

14. The buried infiltrating irrigation pipe according to claim 13, wherein sides of the water infiltrating flow channel symmetrically communicate with the water infiltrating steady flow channel, and an outer side of the water infiltrating steady flow channel communicates with adjacent water infiltrating grooves respectively.

15. The buried infiltrating irrigation pipe according to claim 9, wherein two inner water outlets are symmetrically formed in a pair of ends of the internally embedded water dropper, two water infiltrating flow channels are formed in a pair of ends of the first outer clamp and a pair of ends of the second outer clamp respectively, and the two water infiltrating flow channels communicate with one of the inner water outlets.

16. The buried infiltrating irrigation pipe according to claim 15, wherein the water infiltrating flow channels located at the two ends are connected through the water infiltrating steady flow channels.

17. The buried infiltrating irrigation pipe according to claim 16, wherein an outer side of the water infiltrating steady flow channels communicates with adjacent water infiltrating grooves respectively.

\* \* \* \* \*